US006958832B1

(12) United States Patent
Murata (10) Patent No.: US 6,958,832 B1
(45) Date of Patent: Oct. 25, 2005

(54) CONTROL METHOD FOR DOCUMENT SCANNING DEVICE

(75) Inventor: Yukio Murata, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/433,741

(22) Filed: Nov. 4, 1999

(30) Foreign Application Priority Data

Nov. 11, 1998 (JP) .................................. 98-320453

(51) Int. Cl.[7] .......................................... H04N 1/04
(52) U.S. Cl. ...................... 358/474; 358/1.15; 382/306
(58) Field of Search ............................. 358/474, 1.15, 358/486, 405, 468, 442, 400, 401, 448; 382/306

(56) References Cited

U.S. PATENT DOCUMENTS

| | | | | |
|---|---|---|---|---|
| 5,262,801 A | * | 11/1993 | Serizawa ..................... | 347/247 |
| 5,532,844 A | * | 7/1996 | Kagami et al. ............. | 358/468 |
| 5,805,312 A | * | 9/1998 | Ozawa et al. ............... | 358/503 |
| 5,822,508 A | * | 10/1998 | Ohara ......................... | 395/114 |
| 5,852,501 A | * | 12/1998 | Maehara et al. ............ | 358/505 |
| 5,898,507 A | * | 4/1999 | Nakane et al. .............. | 358/448 |
| 5,959,743 A | * | 9/1999 | Tanaka ........................ | 358/450 |
| 6,081,347 A | * | 6/2000 | Yasuda ........................ | 358/400 |
| 6,134,030 A | * | 10/2000 | Kaneko et al. ............. | 358/505 |
| 6,141,117 A | * | 10/2000 | Shoji .......................... | 358/474 |
| 6,307,974 B1 | * | 10/2001 | Tsujimoto ................... | 382/239 |
| 6,493,757 B1 | * | 12/2002 | Sakai et al. ................. | 709/226 |

* cited by examiner

*Primary Examiner*—Kimberly Williams
*Assistant Examiner*—Negussie Worku
(74) *Attorney, Agent, or Firm*—Fitzpatrick, Cella, Harper & Scinto

(57) ABSTRACT

A document scanning device reads an image on a document while scanning the image, and generates image data based on the image. The document scanning device selects and sets a scanning speed in accordance with a transfer mode used when the document scanning device transfers the image data to another apparatus. The document scanning device controls the amount of generated image data by using the set scanning speed to successively read the image, whereby optimal transfer processing in accordance with the transfer mode can be performed. By switching a transfer path in accordance with the type of the read data, i.e., binary data per pixel or multilevel data per pixel, efficient data transfer can be performed.

23 Claims, 7 Drawing Sheets

FIG. 1

FIG. 2
READER 1-5

CONTROL METHOD FOR DOCUMENT SCANNING DEVICE

BACKGROUND OF THE INVENTION

1. Field of the Invention

The present invention relates to document scanning devices for reading an image on a document, and control methods therefor.

2. Description of the Related Art

A conventional method has been used in which document scanning devices, such as scanners, facsimile devices, and copying machines, having the function of reading an image on a document are connected to a personal computer or the like, and image data obtained by reading the image while scanning the document are transferred to the personal computer.

The types of interface between the personal computer and the document scanning devices include a bidirectional parallel interface based on the IEEE P1284, SCSI, and RS232C standards. Among these types of interfaces, the IEEE P1284 is the most common, and has various modes such as compatible mode, nibble mode, extended capabilities port (ECP) mode, byte mode, and enhanced parallel port (EPP) mode, whose transfer speeds differ greatly. The transfer speed is determined by the transfer mode and typically operates at dozens to hundreds of Kb/s, although it depends on the use of the personal computer. It is said that the universal serial bus (USB), whose transfer speed is at least 1 Mb/s, will be widely used instead of the IEEE P1284 in the future.

In addition, according to the IEEE 1394 interface, data can be transferred at 100 Mbytes/s or greater.

In adaptation for various types of interface and various reading modes, the realization of the desired functions in accordance with the transfer speed and the matching of system performance with the transfer speed are important considerations. Accordingly, a system capable of flexibly adapting to various transfer modes or various types of transfer interfaces, regardless of transfer speed, is in demand.

In the case where the operation of reading an image as multiple data per pixel, such as 8-bit data per pixel is realized, the amount of the data to be transferred is eight times that of reading an image as binary data per pixel. Therefore, a data-transfer load on the system bus of the document scanning device limits the transfer speed of the interface, even when a high transfer speed is used.

Conversely, a low transfer speed causes transfer processing to require a large buffer memory capacity since the low transfer speed prevents the transfer processing from being matched with a speed at which image data are generated.

SUMMARY OF THE INVENTION

Accordingly, it is an object of the present invention to provide a document scanning device in which the above-described problems are eliminated, and a control method therefor.

It is another object of the present invention to provide a document scanning device for performing reading processing in accordance with a transfer mode used when read data are transferred, and a control method therefor.

It is a further object of the present invention to provide a document scanning device for optimizing memory capacity used when read data are transferred.

To these ends, according to a first aspect of the present invention, the foregoing objects are achieved through provision of a document scanning device including a scanning unit for scanning an image on a document and generating image data based on the image, a transfer unit for transferring the image data from the scanning unit, a selection unit for selecting a transfer mode for transferring the image data by the transfer unit, and a control unit for controlling the scanning operation of the scanning unit in accordance with the transfer mode selected by the selection unit.

According to a second aspect of the present invention, the foregoing objects are achieved through provision of an image processing apparatus including an input unit for inputting image data, a transfer unit for transferring the image data input by the input unit, a determination unit for determining whether the image data input by the input unit are binary data per pixel or multilevel data per pixel, and a control unit for controlling a transfer path for the image by the transfer unit in accordance with a determination result by the determination unit.

According to a third aspect of the present invention, the foregoing objects are achieved through provision of a document scanning device including a scanner for scanning an image on a document and generating image data based on the image, a transmitter for transmitting the image data from the scanner, a selector for selecting a transmission speed for transmitting the image data by the transmitter, and a controller for controlling the scanning operation of the scanner in accordance with the transmission speed selected by the selector.

According to a fourth aspect of the present invention, the foregoing objects are achieved through provision of an image processing apparatus including a scanner for scanning an image on a document and generating image data based on the image, a transmitter for transmitting the image data from the scanner, a detector for detecting whether the image data obtained from the scanner are binary data per pixel or multilevel data per pixel, and a controller for controlling a transfer path for the image data by the transmitter in accordance with a detection result by the detector.

According to a fifth aspect of the present invention, the foregoing objects are achieved through provision of a control method for a scanner. The control method includes the steps of scanning an image on a document and generating image data based on the image, transferring the image data obtained in the scanning step, selecting a transfer mode for transferring the image data in the transferring step, and controlling the scanning operation in the scanning step in accordance with the transfer mode selected in the selecting step.

According to a sixth aspect of the present invention, the foregoing objects are achieved through provision of a control method for an image processing apparatus. The control method includes the steps of inputting image data, transferring the image data input in the inputting step, determining whether the image data input in the inputting step are binary data per pixel or multilevel data per pixel, and controlling a transfer path for the image data in the transferring step in accordance with a determination result obtained in the determining step.

According to a seventh aspect of the present invention, the foregoing objects are achieved through provision of a computer-readable program for controlling a scanner, which is stored in a storage medium, in which the computer-readable program includes the steps of scanning an image on a document and generating image data based on the image, transferring the image data obtained in the scanning step, selecting a transfer mode for transferring the image data in the transferring step, and controlling the scanning operation in the scanning step in accordance with the transfer mode selected in the selecting step.

According to an eighth aspect of the present invention, the foregoing objects are achieved through provision of a computer-readable program for controlling a scanner, which is stored in a storage medium, in which the computer-readable program includes the steps of inputting image data, transferring the image data input in the inputting step, determining whether the image data input in the inputting step are binary data per pixel or multilevel data per pixel, and controlling a transfer path for the image data in the transferring step in accordance with a determination result obtained in the determining step.

The above-described objects and other objects of the present invention become apparent from the following detailed description based of the accompanying drawings.

DESCRIPTION OF THE PREFERRED EMBODIMENTS

With reference to the accompanying drawings, the present invention is described below based on the following embodiments.

Figure 1:
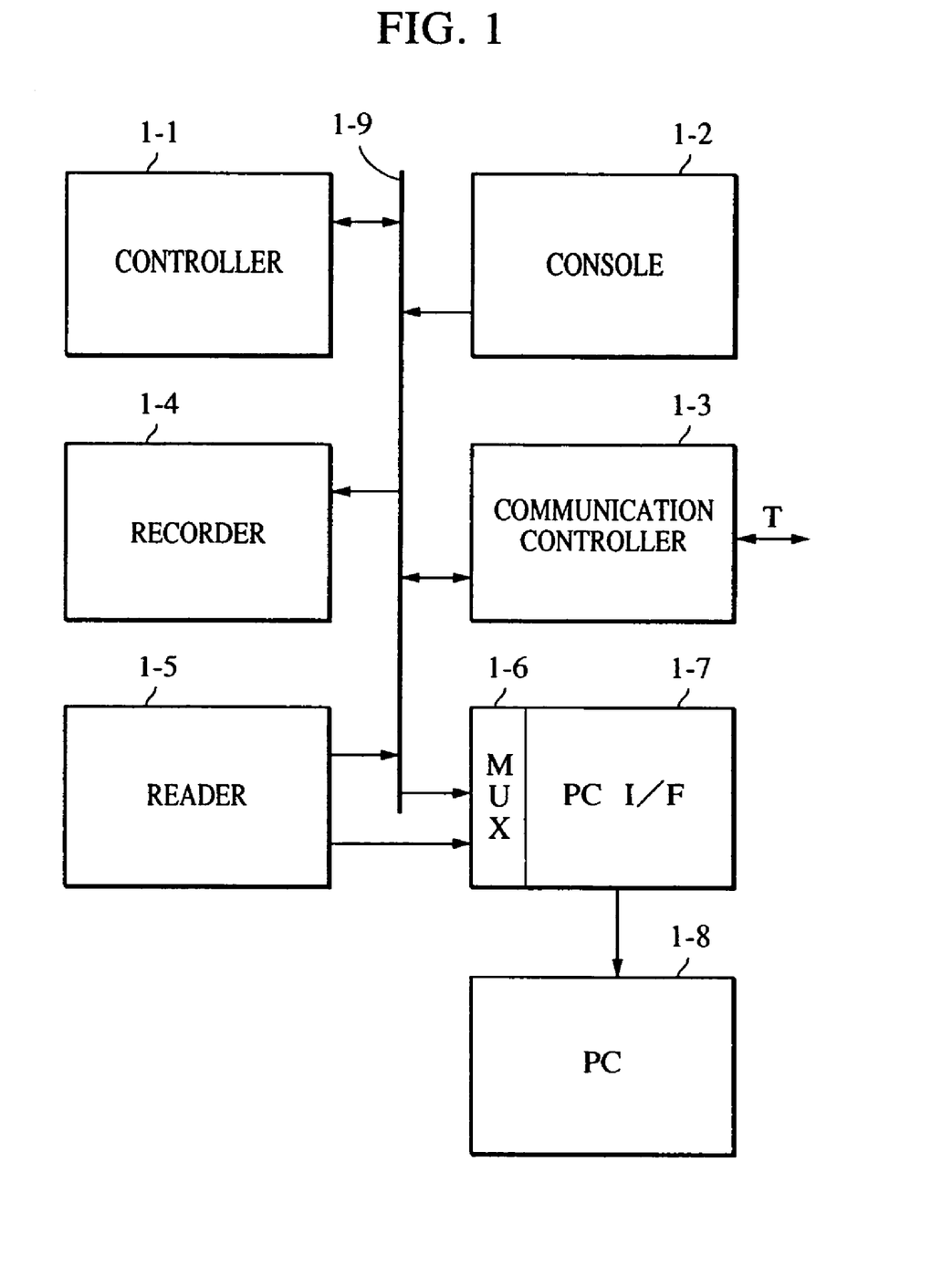
FIG. 1 is a block diagram showing an image processing system according to a first embodiment of the present invention, which includes a facsimile device and a personal computer.

FIG. 1 shows an image processing system according to a first embodiment of the present invention, which includes a facsimile device and a personal computer.

A controller 1-1 for controlling the entirety of the facsimile device comprises a microcomputer circuit including a microcomputer, a read only memory (ROM), a random access memory (RAM), a clock integrated circuit, a direct memory access controller, and a timer. The controller 1-1 controls the operations of the entire facsimile device by performing microcomputer software control, and manages various data, such as fingertip dialing information, and sender names.

A console 1-2 having various keys, indicators, etc., receives inputs by the keys from an operator and display various types of information. A communication controller 1-3 includes a line interface and a telephone circuit. The communication controller 1-3 sends and/or receives image data and communication-control data on line T, and performs control of receiving incoming calls and sending outgoing calls.

A reader 1-5 includes a charge-coupled device, an analog-to-digital (A/D) converting circuit, and an image processing circuit. The reader 1-5 implements, on data obtained by scanning a document and optically reading an image on the document, image processes such as by photoelectric conversion, A/D conversion, image correction, and binarization. A recorder 1-4 consists of a printer, such as a laser beam printer or an inkjet printer.

A multiplexer (MUX) 1-6 selectively uses a control bus 1-9 and the reader 1-5 to output data to a personal computer interface (PC I/F) 1-7. The control bus 1-9 includes lines for an address signal, a data signal, a write signal, and a read signal.

The PC I/F 1-7 is used to perform data transmission and reception with a general personal computer (PC) 1-8. An interface standard such as the bidirectional Centronics interface or the USB is employed in the PC I/F 1-7.

Figure 2:
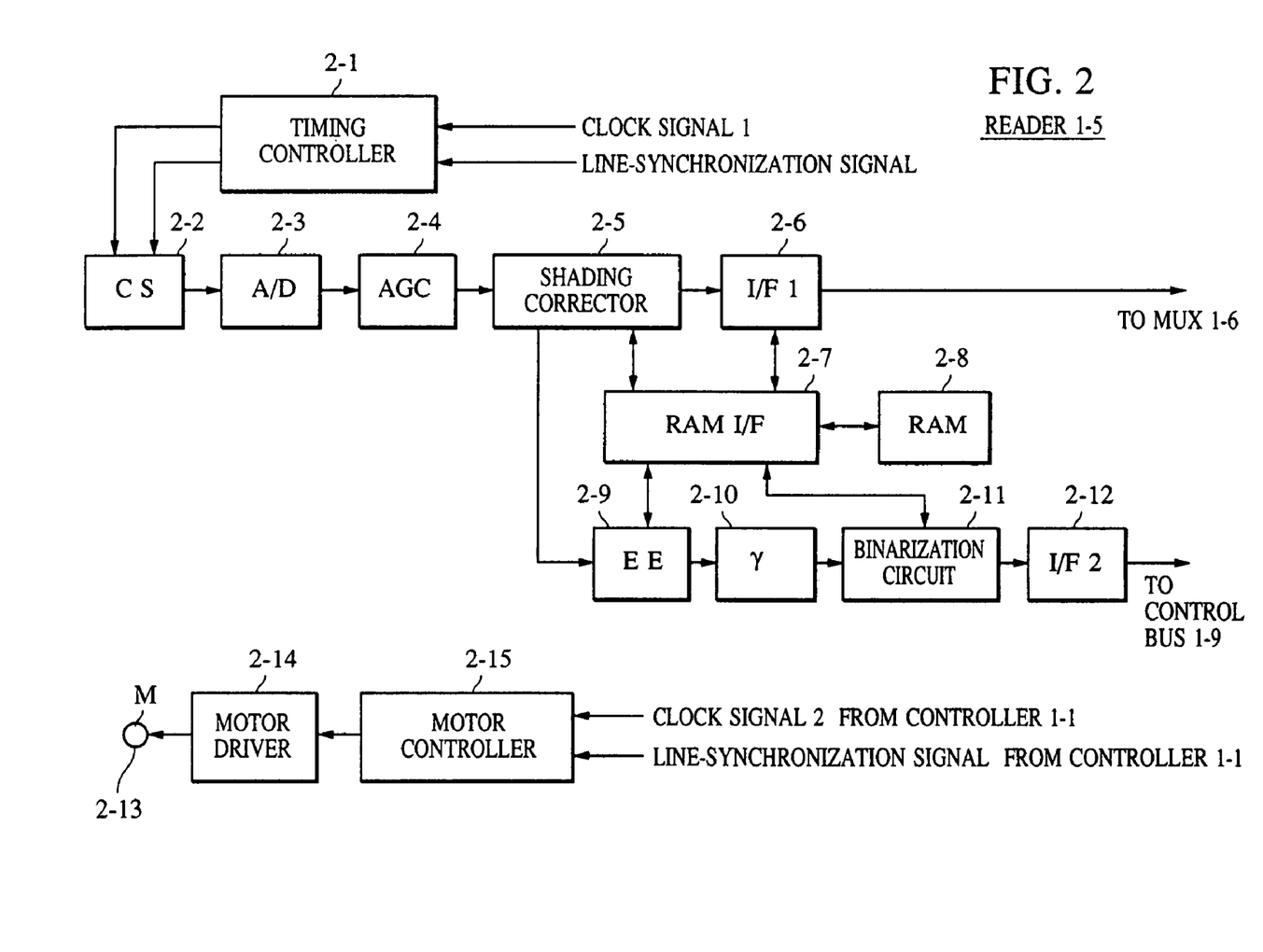
FIG. 2 is a block diagram showing the reader of the facsimile device in the image processing system shown in FIG.

FIG. 2 shows the details of the reader 1-5.

A timing controller 2-1 receives a line-synchronization signal and a clock signal 1 from the controller 1-1, and outputs a control signal to a contact image sensor (hereinafter referred to as a "CS") 2-2, and operation clock signals and synchronization signals to other functional units.

After performing photoelectric conversion on image data obtained by scanning a document, i.e., image data obtained by sequentially performing optical reading of an image on the document along the direction in which the document is moved by a reading motor 2-13, the CS 2-2 outputs the converted image data. Whenever the line-synchronization signal is input, the CS 2-2 outputs one line of image data in synchronization with the clock signal 1. The image data read by the CS 2-2 are converted from analog into digital form by an analog-to-digital (A/D) converter 2-3.

The gain of the digital data is adjusted by an automatic gain controller (AGC) 2-4, and shading correction of the adjusted data is executed by a shading corrector 2-5. For the shading correction, reference data obtained by storing reference white in a random access memory (RAM) 2-8 beforehand are read and used via a RAM interface circuit (hereinafter referred to as a "RAM I/F") 2-7.

In the case where 8-bit data per pixel are output, the data corrected by shading correction are output to the MUX 1-6 via a first interface circuit (indicated as "I/F 1" in FIG. 2) 2-6.

In the case where binary data per pixel are output, the following image processing is executed.

An edge-enhancement circuit (hereinafter referred to as an "EE") 2-9 uses the RAM I/F 2-7 to store, in the RAM 2-8, the multilevel data corrected by shading correction, and uses Laplace transform techniques to perform edge enhancement based on data of three lines. A gamma converter (indicated as "γ" in FIG. 2) 2-10 executes brightness-density conversion on the data processed by edge enhancement.

A binarization circuit 2-11 binarizes the converted data by error diffusion or simply using a predetermined slice level. In error diffusion, binarization is executed while reading errors caused by the binarization of adjacent pixels from the RAM 2-8 via the RAM I/F 2-7, and errors caused by binarization are stored in the RAM 2-8 through the RAM I/F 2-7.

The binarized image data are converted from serial into parallel form by a second interface circuit (indicated as "I/F 2" in FIG. 2) 2-12, and the converted data are output to the control bus 1-9.

As described above, the image data read by the CS 2-2 are converted into multilevel data or binary data, and the converted data are output.

The reading motor 2-13 is driven to rotate by a motor driver 2-14. Driving-timing control and phase control are executed by the motor controller 2-15. The controller 1-1 inputs a line-synchronization signal and a clock signal 2 to the motor controller 2-15, and the motor controller 2-15 drives the reading motor 2-13, using, for example, the timing shown in FIGS. 3A and 3B.

Figure 3A:
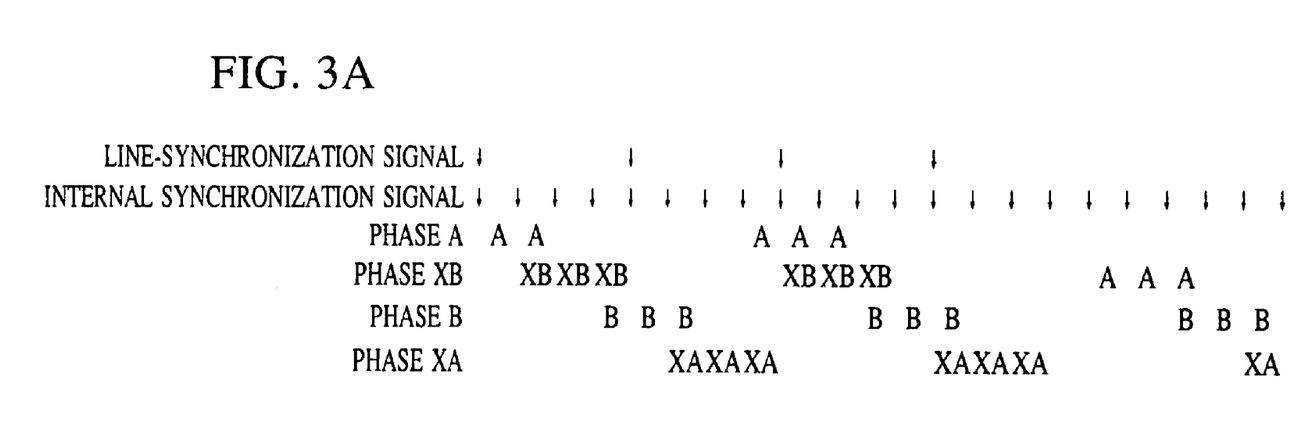
FIGS. 3A and 3B are timing charts showing reading speed control by the reader shown in FIG. 2.
Figure 3B:
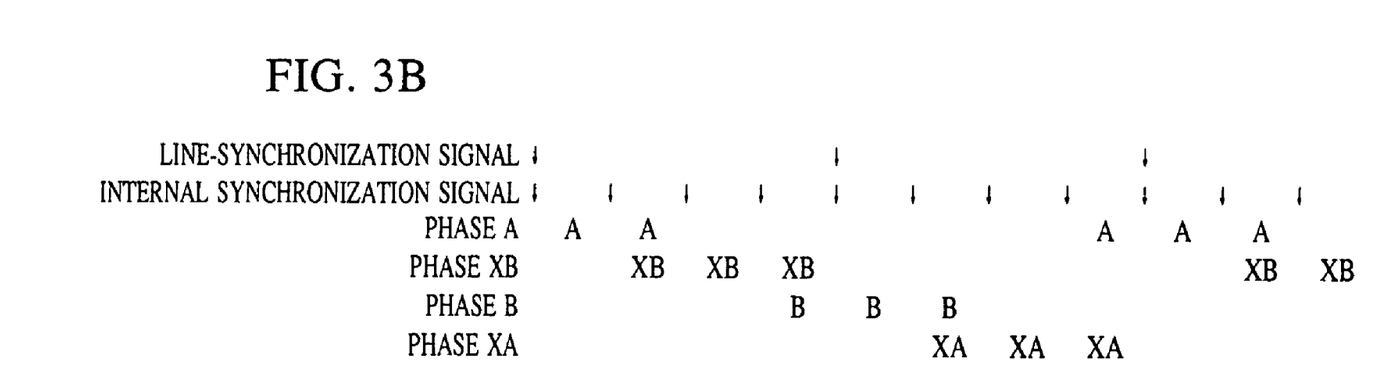

FIGS. 3A and 3B show a case in which the reading motor 2-13 is driven by performing phase control.

Each interval of the line-synchronization signal to be input, shown in FIG. 3A, is double that of the line-synchronization signal to be input, shown in FIG. 3B, and the frequency of the clock signal to be input, shown in FIG. 3A, is double that of the clock signal to be input, shown in FIG. 3B. By inputting each line-synchronization signal, one line is read. The reading speed corresponding to the line-synchronization signal shown in FIG. 3A is double that corresponding to the line-synchronization signal shown in FIG. 3B.

By changing the line-synchronization signal and the clock frequency, the reading speed can be changed.

Figure 4:
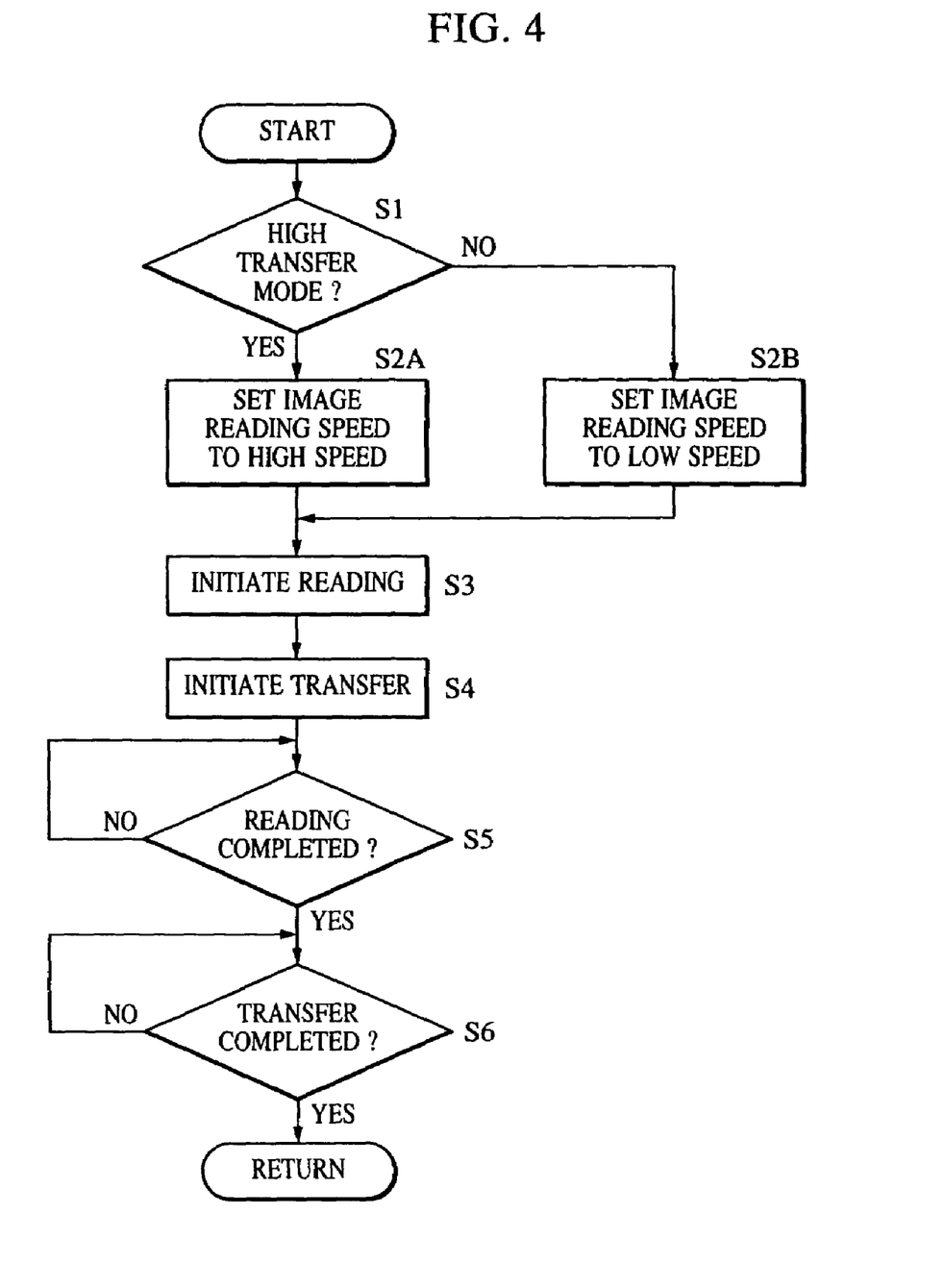
FIG. 4 is a flowchart showing a control process in the first embodiment.

FIG. 4 is a flowchart showing a case in which in the first embodiment, binary data are transferred from the reader 1-5 of the facsimile device to the PC 1-8. This flowchart shows a process that is controlled based on data representing a program stored in the ROM of the controller 1-1 by the microprocessor of the controller 1-1.

In step S1, the process starts in accordance with a reading instruction from the PC 1-8, and determines whether the transfer mode is set for a high speed when the reading instruction is received. In the case where the interface used is, for example, the bidirectional Centronics interface, the process determines that the transfer mode is set for a high speed when a transfer mode determined by a negotiation phase is the ECP mode, and determines that the transfer mode is set for a low speed when the transfer mode determined by the negotiation phase is the nibble mode.

In steps S2A and S2B, the image reading speed for each mode is set. The setting may be performed by storing, in a table in the ROM of the controller 1-1, parameters for combinations of transfer modes and reading resolutions, such as line-synchronization signals, clock frequencies, and motor-excitation patterns, and reading them when each mode is executed. The parameters include those for transfer to the recorder 1-4 and those for transmission by the communication controller 1-3. Based on the reading resolution designated by the PC 1-8, the parameters in accordance with the transfer mode determined in step S1 are selected and set.

In step S3, the read parameters are used to initiate reading, and in step S4, the process initiates transfer of image data while temporarily storing a minimum of the image data in the RAM 2-8. After that, in step S5, the process determines whether the reading of the image data has been completed. If the reading of the image data has been completed, in step S6, the process determines whether the transfer of the image has been completed. On completion of transferring the image data, control of the reading of image data and transfer of the image data is terminated.

Figure 5:
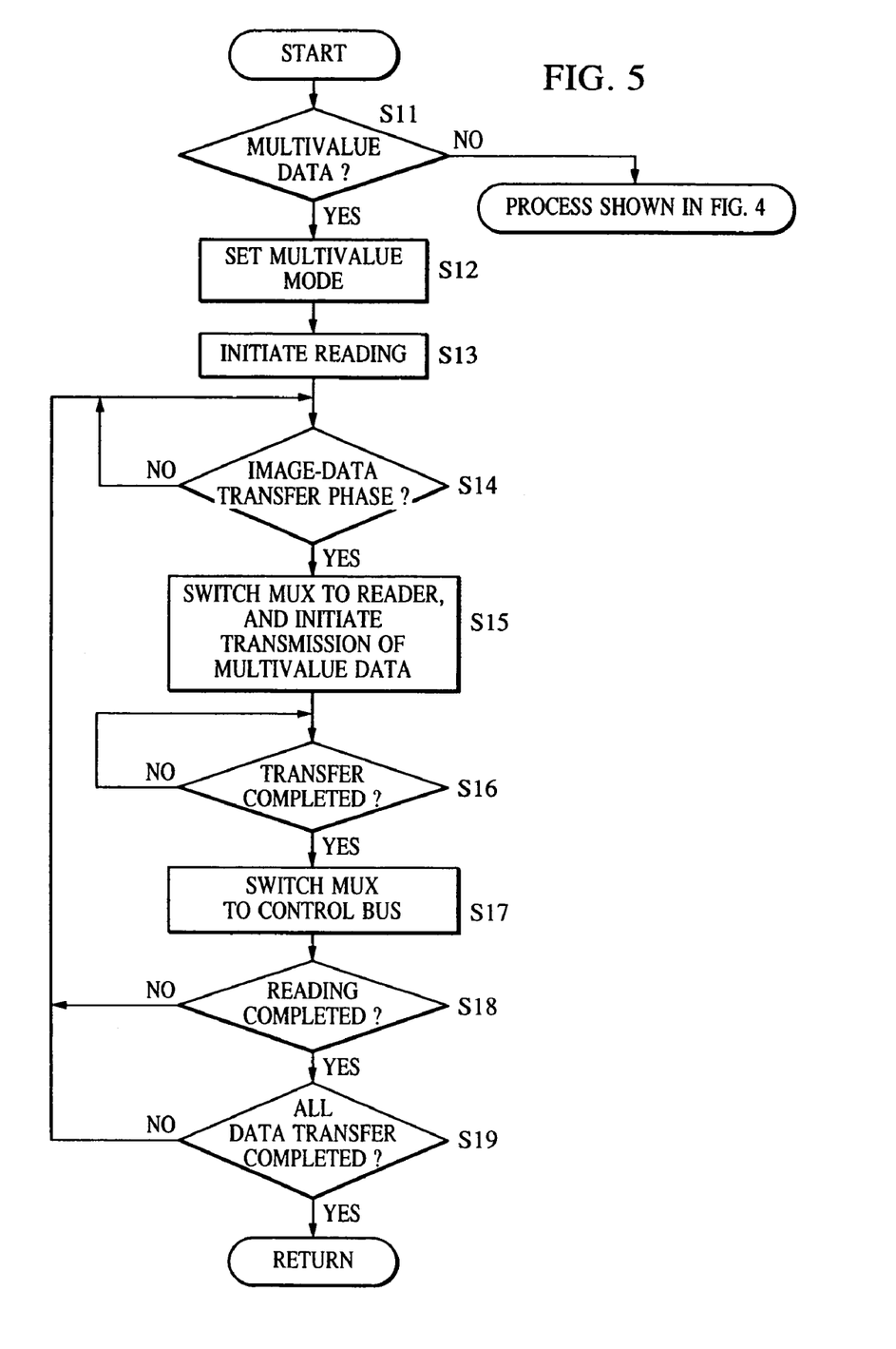
FIG. 5 is a flowchart showing a control process by the image processing system shown in FIG. 1.

FIG. 5 is a flowchart showing a control process performed when in the first embodiment, multilevel data are transferred from the reader 1-5 of the facsimile device to the PC 1-8. This flowchart also shows a process that is controlled based on data representing a program stored in the ROM of the controller 1-1 by the microprocessor of the controller 1-1.

In step S11, the process starts in accordance with a reading instruction from the PC 1-8, and determines whether image data to be transferred are multilevel data, based on the contents of the instruction from the PC 1-8. If the process has determined that the image data to be transferred are binary data, the process shown in FIG. 4 is performed. If the process has determined that the image data to be transferred are multilevel data, in step S12, the process sets a transfer path for the image data, which is adapted for a multilevel-data mode. In other words, the output of the first interface circuit IF/1 2-6 is selected. In step S13, the process initiates the scanning of a document, and the reading of an image while temporarily storing the image data in the RAM 2-8.

In the control reading multilevel data, reading parameters for the multilevel-data mode are read from the ROM of the controller 1-1, and the reading speed is controlled. In step S14, when the multilevel-data mode proceeds to a data transfer phase for transferring the image data stored in the RAM 2-8, in step S15, the MUX 1-6 is switched to the reader 1-5, and transfer of multilevel data per pixel from the reader 1-5 via the PC I/F 1-7 is initiated.

If the transfer of the multilevel data has been finished in step S16, the MUX 1-6 is switched to the control bus 1-9. This is because when image data are transferred in units of certain bytes, for example, in units of 64 kilobytes, image data and control data are alternately transmitted and received, and in such a case, the MUX 1-6 must be successively switched.

In step S18, the process determines whether reading has been finished. In step S19, the process determines whether transfer of all the multilevel data has been finished. If the transfer has been finished, control of the reading and transfer of the multilevel data is terminated.

Figure 6:
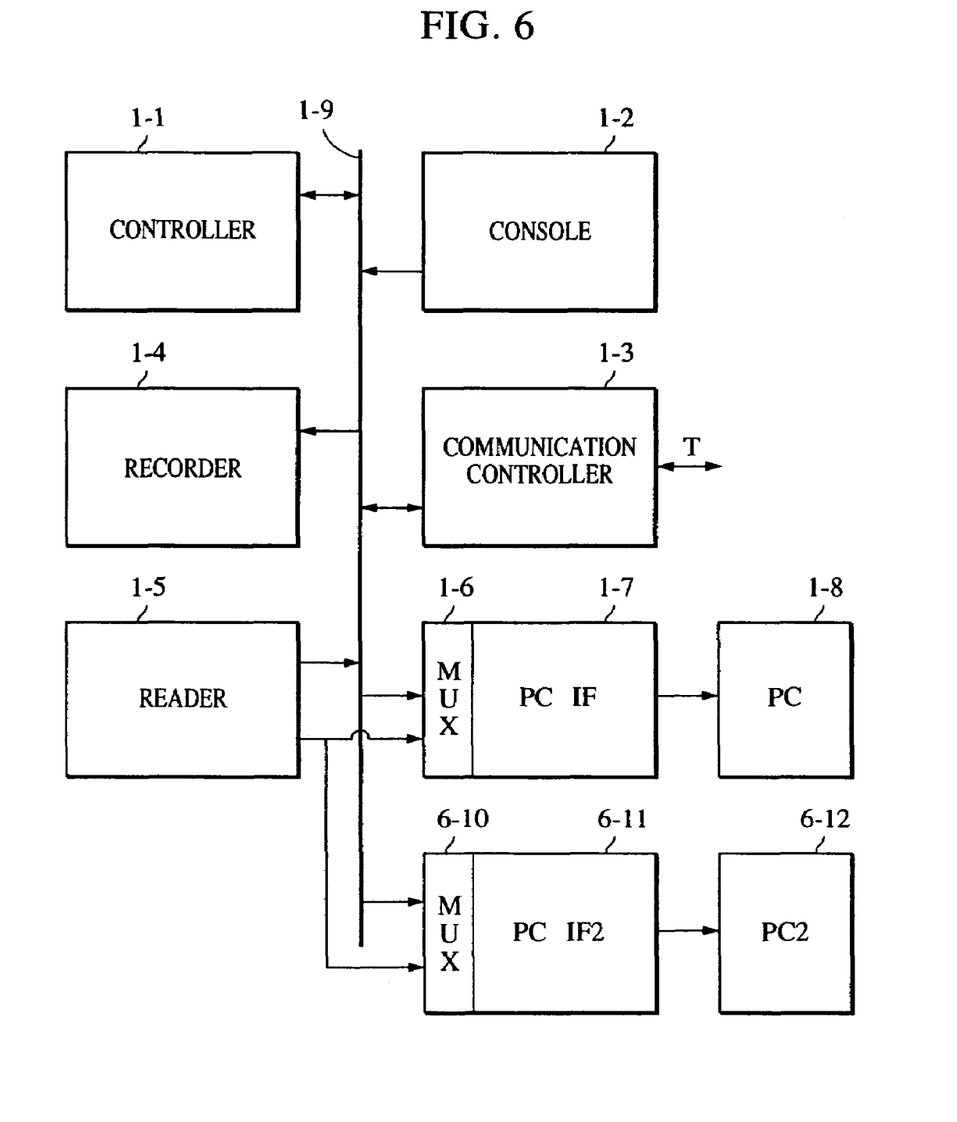
FIG. 6 is a block diagram showing an image processing system according to a second embodiment of the present invention.

Referring to FIG. 6, the structure of an image processing system according to a second embodiment of the present invention is shown. Blocks identical to those shown in FIG. 1 are denoted by identical reference numerals, and descriptions thereof are omitted.

A MUX 1-6 switches between a reader 1-5 and a control bus 1-9, similarly to the MUX shown in FIG. 1. A second PC I/F 6-11 is used to perform data transmission and reception with a second PC 6-12, similarly to the PC I/F 1-7. An interface standard such as the bidirectional Centronics or the USB is employed in the PC I/F 1-7.

The types of the PC I/F 1-7 and the second PC I/F 6-11 differ. For example, when the bidirectional Centronics interface is used as the PC I/F 1-7, the USB is used as the second PC I/F 6-11. The USB enables a transmission speed of approximately 1 Mb/s, which is 5 to 30 times greater than that of the bidirectional Centronics interface.

Figure 7:
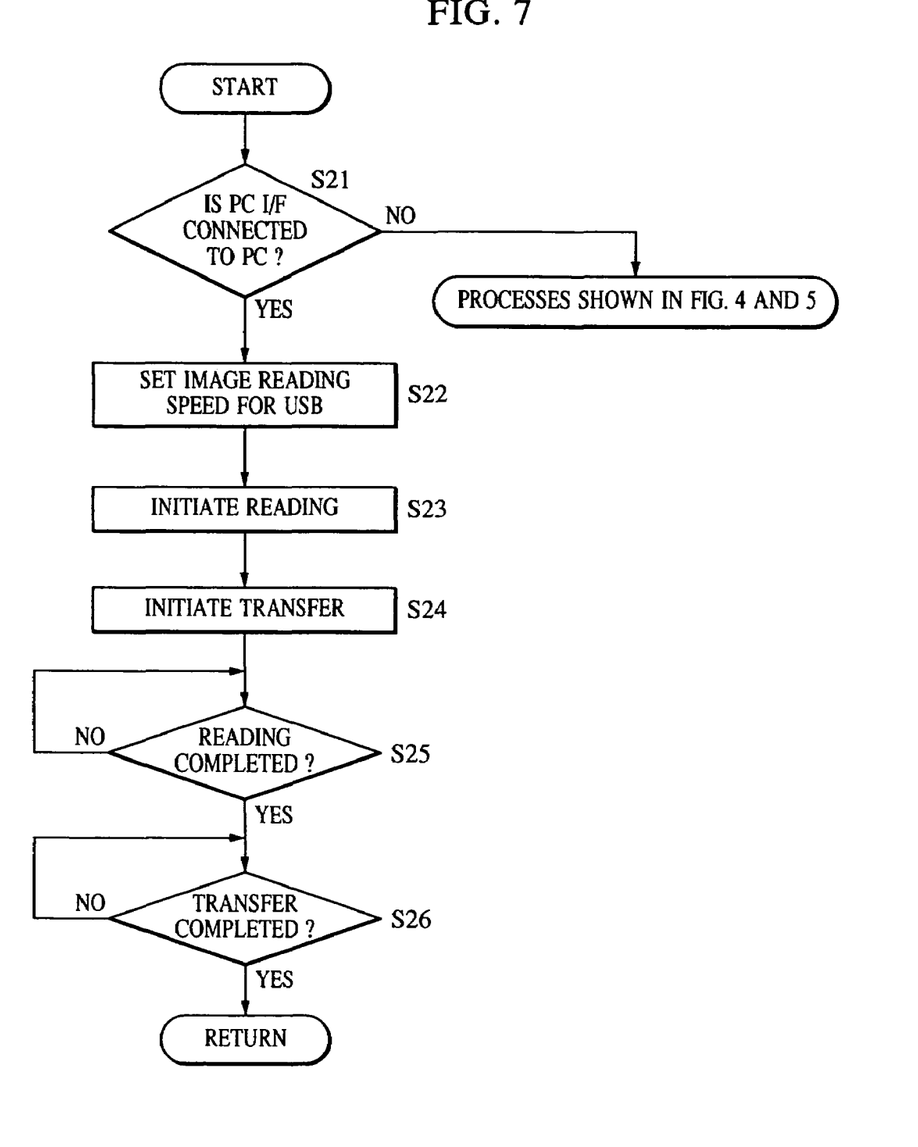
FIG. 7 is a flowchart showing the operation of control in the image processing system shown in FIG. 6.

FIG. 7 is a flowchart showing a case in which image data are transferred to the PC 1-8 or the PC 6-12. A control process of changing the reading speed for a type of interface used for connection is described below based on the flowchart.

In step S21, the process determines whether a type of interface to which a PC is connected is the USB. If the type of interface is a bidirectional Centronics interface, the process shown in FIG. 4 or 5 is performed. If the type of interface is the USB, the process sets the image reading speed to a high speed for the USB. At this time, parameters for high speed reading, corresponding to the USB, are selected from among the parameters stored in the ROM of the controller 1-1.

In step S23, the process initiates the scanning of a document and the reading of an image on the document, and temporarily stores the image data in the RAM 2-8. In step S24, the process initiates transmission of the image data.

After that, in step S25, the process determines whether the reading has been completed. In step S26, if the process has determined that transfer of the image data has been completed, the process terminates the reading and transfer of the image data.

In the above-described embodiments, an apparatus such as a printer, other than the PC, may be used as a receiver to which read data are transferred. Concerning the document scanning device, devices other than the facsimile device, e.g., a copying machine and a scanner having only the function of reading, may be used.

In the above-described embodiments, an image reading instruction is received via each PC I/F 1-7. However, it may be received from the console 1-2.

As described above, according to the above-described embodiments, in an image processing system in which a PC or the like and a document scanning apparatus are connected by an interface, operations adapted for various types of interface and transfer speeds thereof, and various reading modes are realized.

In other words, in the case where image data obtained by reading an image on a document are transferred to a terminal such as a PC, by providing a plurality of document scanning speeds (image reading speeds) corresponding to types of transmission interface and transmission modes, and selectively using the speeds to perform reading, a reading speed appropriate for the transfer speed is realized.

In the case where image data obtained by reading an image on a document are transferred to a terminal, such as a PC, by separating paths for transferring multilevel data and binary data as image data, a load on the system when the multilevel data are transferred can be reduced, and a maximum transfer speed is realized.

By using an optimal reading speed in accordance with a transfer mode to read an image, the amount of generated image data can be controlled to save buffer memory capacity.

Although the case where read data are transferred to a PC has been described, transfer of read data to the recorder 1-4 (copying) and transmission of read data via the communication controller 1-3 (facsimile transmission) can perform reading at a reading speed in accordance with a reading resolution and a receiver to which read data are transferred.

The present invention may be applied not only to a system including a plurality of apparatuses (e.g., a host computer, interface units, a reader, a printer, etc.) but also to an apparatus (e.g., a copying machine or a facsimile device) having a single function.

The scope of the present invention includes a modification practiced by providing software a program code to a computer (e.g., a central processing unit (CPU) or microprocessor unit) in an apparatus or system connected to a plurality of devices so that the devices can operate in order to realize the functions of the foregoing embodiments, and causing the devices to operate in accordance with programs stored in the computer in the apparatus or system.

In this case, the software program code realize the functions of the foregoing embodiments. Accordingly, the program code, a provision unit for providing the computer with the program code, and a storage medium for storing the program code constitute the present invention.

The types of the storage medium for storing the program code include, for example, a floppy disk, a hard disk, an optical disk, a magneto-optical disk, a compact-disk read-only memory, a magnetic tape, a nonvolatile memory, and a read-only memory.

The present invention includes not only a modification in which the functions of the foregoing embodiments are realized such that the computer executes the provided program code, but also another modification in which the functions of the foregoing embodiments are realized by executing the program code in association with an operating system for the computer or application software.

In addition, the present invention also includes an embodiment in which the provided program code is stored in a memory of a computer add-in board or an add-in unit connected to the computer, and the functions of the foregoing embodiments are realized such that the CPU or the like of the add-in board or unit implements part or all of actual processes.

Although the present invention has been described based on the foregoing embodiments, which are preferable, the present invention is not limited to the foregoing embodiments, but may be variously modified within the scope of the claims.

What is claimed is:

1. A document scanning device comprising:
   scanning means for scanning an image on a document;
   generating means for generating image data based on the scanned image;
   a plurality of transfer paths for transferring the image data from said generating means, each transfer path having an interface circuit;
   determination means for determining whether the image data generated by said generation means are binary data per pixel or multilevel data per pixel;
   selection means for selecting a transfer path from the plurality of transfer paths based on the determination made by said determination means; and
   control means for controlling a scanning operation of said scanning means in accordance with the transfer path selected by said selection means.

2. The document scanning device according to claim 1, wherein said control means controls a scanning speed of said scanning means.

3. The document scanning device according to claim 1, further comprising an interface for establishing a connection to an image processing apparatus,
   wherein said transfer means transfers the image data to said image processing apparatus via said interface.

4. The document scanning device according to claim 3, wherein said selection means selects the transfer path in accordance with parameters of said interface.

5. The document scanning device according to claim 3, wherein said selection means selects the transfer path, based on an instruction received from said image processing apparatus via said interface.

6. An image processing apparatus comprising:
   input means for inputting image data;
   a plurality of transfer paths for transferring the image data input by said input means, each transfer path having an interface circuit;
   determination means for determining whether the image data input by said input means are binary data per pixel or multilevel data per pixel; and
   control means for controlling a transfer path from the plurality of transfer paths in accordance with a determination result by said determination means.

7. The image processing apparatus according to claim 6, wherein said input means inputs the image data obtained by scanning an image on a document.

8. The image processing apparatus according to claim 6, further comprising an interface for establishing a connection to another image processing apparatus, wherein said transfer means transfers the image data to said another image processing apparatus via said interface.

9. The image processing apparatus according to claim 8, wherein said control means selects the transfer path in accordance with parameters of said interface.

10. The image processing apparatus according to claim 8, wherein said determination means determines, based on an instruction received from said another image processing apparatus received via said interface, whether the image data input by said input means are binary data per pixel or multilevel data per pixel.

11. An image processing apparatus comprising:
   a scanner which scans an image on a document and generates image data based on the image;
   a plurality of transfer paths for transmitting the image data from said scanner, each transfer path having an interface circuit;
   a detector which detects whether the image data obtained from said scanner are binary data per pixel or multilevel data per pixel; and
   a controller which controls a transfer path from the plurality of transfer paths, in accordance with a detection result by said detector.

12. The image processing apparatus according to claim 11, wherein said controller controls a scanning speed of said scanner.

13. The image processing apparatus according to claim 11, further comprising an interface for establishing a connection to an image processing apparatus,
   wherein said transmitter transmits the image data to said image processing apparatus via said interface.

14. The image processing apparatus according to claim 13, wherein said controller selects the transfer mode in accordance with parameters of said interface.

15. The image processing apparatus according to claim 13, wherein said controller selects the transfer mode based on an instruction received from said image processing apparatus via said interface.

16. A control method for an image processing apparatus, comprising the steps of:
   inputting image data;
   transferring the image data input in said inputting step via a plurality of transfer paths, each transfer path having an interface circuit;
   determining whether the image data input in said inputting step are binary data per pixel or multilevel data per pixel; and
   controlling a transfer path from the plurality of transfer paths in accordance with a determination result obtained in said determining step.

17. The control method according to claim 16, wherein said controlling step controls an inputting speed of said inputting step.

18. The control method according to claim 16, further comprising an interfacing step for establishing a connection to an image processing apparatus,
   wherein said transferring step transfers the image data to the image processing apparatus during said interfacing step.

19. The control method according to claim 16, wherein said controlling step selects the transfer mode in accordance with parameters of said interfacing step.

20. A computer-readable program for controlling a scanner, said computer-readable program stored in a medium, said computer-readable program comprising the steps of:
   inputting image data;
   transferring the image data input in the inputting step, via a plurality of transfer paths, each transfer path having an interface circuit;
   determining whether the image data input in the inputting step are binary data per pixel or multilevel data per pixel; and
   controlling a transfer path from the plurality of transfer paths in accordance with a determination result obtained in the determining step.

21. The computer-readable program according to claim 20, wherein the controlling step controls an inputting speed of the inputting step.

22. The computer-readable program according to claim 20, further comprising an interfacing step for establishing a connection to an image processing apparatus,
   wherein the transferring step transfers the image data to the image processing apparatus during the interfacing step.

23. The computer-readable program according to claim 20, wherein the controlling step selects a transfer mode in accordance with parameters of the interfacing step.

* * * * *

UNITED STATES PATENT AND TRADEMARK OFFICE
CERTIFICATE OF CORRECTION

| | | |
|---|---|---|
| PATENT NO. | : 6,958,832 B1 | Page 1 of 1 |
| APPLICATION NO. | : 09/433741 | |
| DATED | : October 25, 2005 | |
| INVENTOR(S) | : Yukio Murata | |

It is certified that error appears in the above-identified patent and that said Letters Patent is hereby corrected as shown below:

<u>ON THE TITLE PAGE, AT ITEM (30), Foreign Application Priority Data</u>:
"98-320453" should read --10-320453--.

<u>COLUMN 7</u>:
Line 55, "realize" should read --realizes--.

Signed and Sealed this

Twenty-seventh Day of November, 2007

JON W. DUDAS
*Director of the United States Patent and Trademark Office*